No. 620,974. Patented Mar. 14, 1899.
C. H. SAPPER.
SURFACING TOOL FOR VALVE SEATS.
(Application filed Apr. 13, 1898.)
(No Model.)
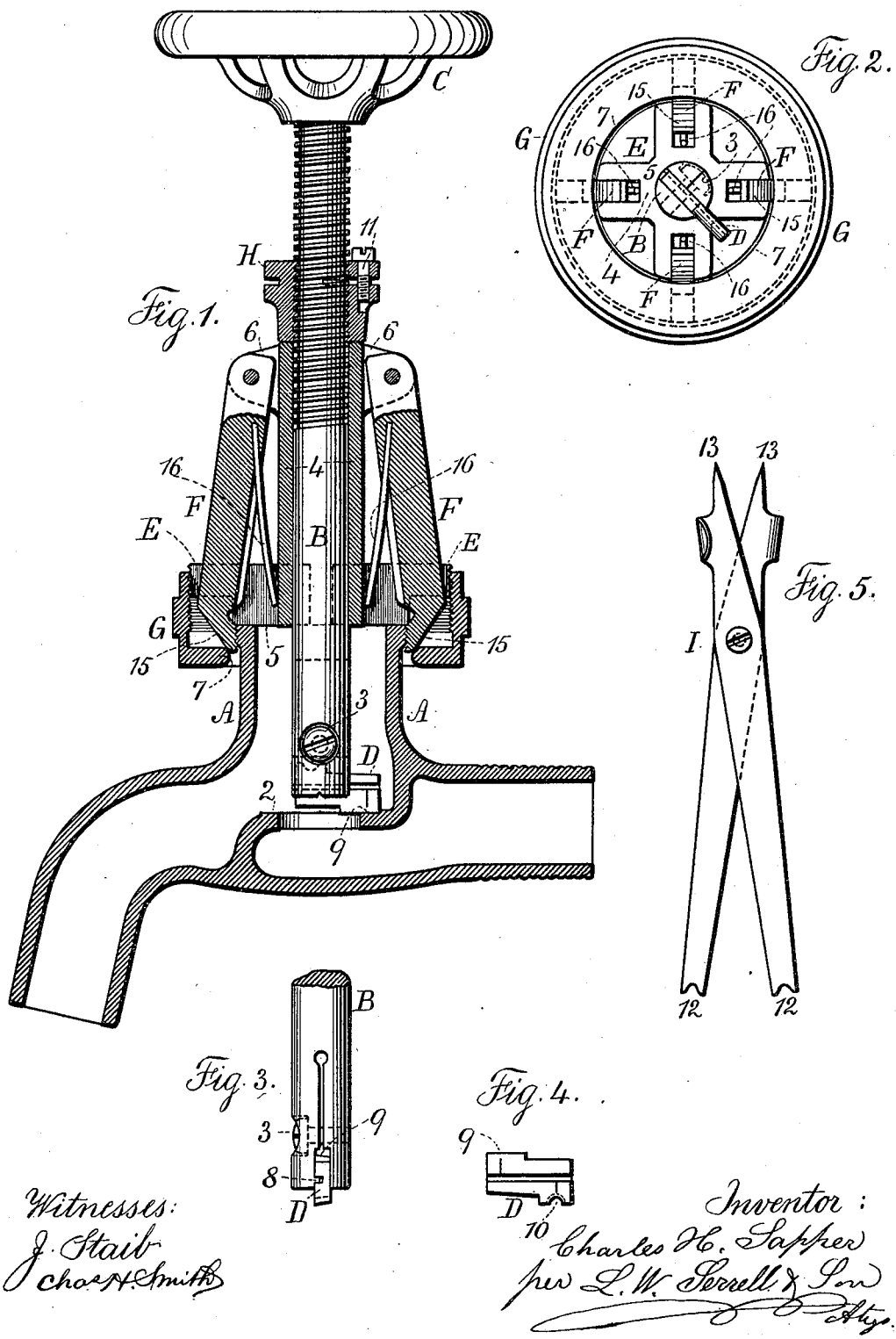
Witnesses:
J. Staib
Chas H Smith
Inventor:
Charles H. Sapper
per L. W. Serrell & Son
Attys.

UNITED STATES PATENT OFFICE.

CHARLES H. SAPPER, OF NEWBURG, NEW YORK.

SURFACING-TOOL FOR VALVE-SEATS.

SPECIFICATION forming part of Letters Patent No. 620,974, dated March 14, 1899.

Application filed April 13, 1898. Serial No. 677,493. (No model.)

*To all whom it may concern:*

Be it known that I, CHARLES H. SAPPER, a citizen of the United States, residing at Newburg, in the county of Orange and State of New York, have invented an Improvement in Surfacing-Tools for Valve-Seats, of which the following is a specification.

Valve-seats frequently become injured by the action of the liquid flowing through the body of the valve and in other instances in consequence of foreign substances being pressed tightly against the valve-seat by the action of the valve.

The present invention is especially intended for resurfacing the seats in valves or faucets for supplying water in buildings; but the same may be employed for surfacing valve-seats in the process of constructing the valve or faucet.

I employ a chuck that is adapted to engage the screw-threaded end of the valve-body, which chuck carries a spindle that can be turned by a hand-wheel, and the surfacing-tool is grasped in the split end of the spindle, and it can be set for a larger or smaller seat, and the cutter can be changed from time to time, according to the shape of the seat or the diameter thereof, and a lock-nut is made use of upon the screw-threaded portion of the spindle to determine the point to which the spindle and tool can be moved in the chuck in dressing off the valve-seat.

In the drawings, Figure 1 is a vertical section representing the present improvement as applied upon a faucet. Fig. 2 is an inverted plan endwise of the spindle. Fig. 3 shows the lower end of the spindle at right angles to Fig. 1. Fig. 4 is a detached side view of the tool, and Fig. 5 is an elevation of the calipers made use of in adjusting the position of the tool or cutter.

The barrel of the valve is represented at A and the valve-seat at 2. These parts of course will vary and are only introduced herein to illustrate the manner in which the present invention is applied in surfacing the valve-seat.

The tool-holding spindle B is made with a hand-wheel C at the upper end, and the lower end is slotted longitudinally to receive the tool or cutter D, there being a screw 3 through the spindle for clamping the tool, and around the spindle B is a stock E, that is made with a tubular portion 4 and a base with a raised surface 5 to rest against the end A of the barrel or faucet, and the end of the stock is slotted radially for the reception of the pivoted clamps F, that are received at their upper ends into jaws 6, through which the attaching pins or pivots pass, and the swinging ends of these pivoted clamps are beveled upon their outer surfaces, and the ring G is screwed upon the periphery of the stock, and it has an inward flange 7, adapted to act against the inclined outer surfaces 15 of the pivoted clamps for pressing them inward and against the exterior surface of the barrel of the valve or faucet for clamping the same, and the inner surfaces of the pivoted clamps are made with screw-threaded sections to fit the screw-thread that is almost always found around the exterior edge of the barrel A, and I provide springs 16 to move the clamps F outward and in contact with the ring-nut.

I remark that the opening in the ring 7 is larger than the largest faucet-barrel to which the surfacing-tool is to be applied, and the raised surface 5 of the stock E is smaller than the opening within the flange 7, so that the ring G can be screwed until the jaws or pivoted clamps F are pressed to their extreme inward positions, the raised surface 5 in this case projecting beyond the ring G, and when the ring G has been screwed tightly upon the stock the pivoted jaws will have been closed to the extreme point, and the proportion of the parts should be such that the chuck is adapted to grasp either the largest or the smallest sized barrel in the ordinary faucets or valves.

In consequence of the raised surface 5 resting upon the end of the barrel and the pivoted clamps grasping the barrel the spindle B will be perpendicular to the end of the barrel and axially in line with the valve-seat, and the pivoted clamps are advantageously made to correspond to the screw-threads upon the exterior surface of the barrel, so as not to injure such threads when the chuck is tightened.

The slotted lower end of the tool-holding spindle is advantageously made with a rib 8 entering a groove in the side of the cutter or tool, and the said cutter or tool can be set at the proper position to act upon the valve-seat. I prefer to make one edge of the cutter straight, as at 9, for dressing a flat valve-seat and the other edge notched, as at 10, for dressing a valve-seat with a raised annular rib, the screw 3 allowing for clamping the cutter in the position to which it may be adjusted.

The lock-nut H surrounds the screw-threaded portion of the tool-holding spindle B, and it is adapted to rest against the upper end of the tubular portion 4 of the stock E and to turn with the spindle, there being sufficient friction obtained by the tightening-screw 11 to prevent the lock-nut H revolving by contact with the end of the tube 4; but the friction should not prevent the nut being adjusted by hand as necessary.

In using this tool the cutter is first to be adjusted so as to adapt it to the seat that is to be surfaced, and with this object in view the calipers I are advantageously made use of for measuring the diameter of the valve-seat or the diameter of the rib upon the valve-seat, and one end of the calipers should be twice as long as the other end, so that by using the ends 12 for measuring the diameter of the seat the ends 13 will correspond to the radius, and hence can be used in measuring the place to which the cutter D is to be adjusted, and with this object in view a cross axial mark should be provided at the end of the spindle and divisions or marks upon the side of the cutter, so that the party about to use the improvement can accurately determine the position required for the cutter and then clamp the tool upon the barrel of the faucet in the manner before indicated and turn the nut H until the tool is allowed to rest upon the valve-seat. The nut H should then be screwed down to lift the tool off the valve-seat and gradually turned to lower the cutter as the spindle and cutter are rotated by hand and the seat for the valve dressed off either flat or with a rib, according to the character desired for the valve-seat. Care should be exercised in adjusting the nut H to prevent the shaving of metal removed by the cutter being too thick.

This tool is easy of application to faucets while fixed in their ordinary positions for use upon pipes, it only being necessary to remove the cap and valve and apply the reseating-tool.

I claim as my invention—

1. The combination with the surfacing-tool and its spindle and means for rotating the same, of a stock adapted to rest upon the upper end of the faucet-barrel and having a tube through which the tool-holding spindle passes, clamps pivoted at their upper ends adjacent to the tube, and their lower ends passing through mortises in the stock and terminating adjacent to the surface of the stock as holding-fingers to grasp the exterior of the barrel, a ring screwed upon the outside of the stock and having a flange acting directly upon the clamps to force the same upon the barrel adjacent to the upper end of such barrel, substantially as set forth.

2. The combination with the hand-wheel and spindle, of a stock having a tubular portion through which the spindle passes, and a base at the end with a projecting surface, clamping-jaws pivoted at one end and having inclined surfaces at the other end and occupying radial slots in the stock, a ring screwed upon the exterior of the stock and having an inward flange for acting upon the beveled portions of the pivoted clamps, the opening in the ring being of greater diameter than the projecting surface of the stock, a cutter received into the end of the tool-holding spindle and a clamping-screw for holding the cutter after it has been adjusted to suit the diameter of the valve-seat, substantially as set forth.

3. The combination with the hand-wheel and spindle, of a stock having a tubular portion through which the spindle passes, and a base at the end with a projecting surface, clamping-jaws pivoted at one end and having inclined surfaces at the other end and occupying radial slots in the stock, a ring screwed upon the exterior of the stock and having an inward flange for acting upon the beveled portions of the pivoted clamps, the opening in the ring being of greater diameter than the projecting surface of the stock, a cutter received into the end of the tool-holding spindle, a clamping-screw for holding the cutter after it has been adjusted to suit the diameter of the valve-seat, and a lock-nut upon the screw-threaded portion of the spindle to rest against the tubular portion of the stock and determine the position of the cutter in finishing the valve-seat, substantially as set forth.

4. The combination with the spindle and means for rotating the same, of a stock adapted to rest upon the upper end of the faucet-barrel and having a tube through which the tool-holding spindle passes, clamps pivoted at their upper ends adjacent to the tube, and their lower ends passing through mortises in the stock and terminating adjacent to the surface of the stock as holding-fingers to grasp the exterior of the barrel, a ring screwed upon the outside of the stock and having a flange acting directly upon the clamps to force the same upon the barrel adjacent to the upper end of such barrel, a surfacing-tool passing into a mortise at the lower end of the spindle and a clamping-screw by which such tool may be adjusted and firmly held in position while surfacing a valve or similar seat, substantially as set forth.

5. The combination in a surfacing device for valve-seats, of a chuck for grasping the barrel of the valve or faucet, a spindle supported by the chuck and axial to the barrel and having a slotted end, a tool received into the slotted end of the spindle and having one portion adapted to dress a flat valve-seat and another portion adapted to dress a raised valve-seat, the tool or cutter being reversible in the spindle, substantially as set forth.

Signed by me this 1st day of March, 1898.

CHARLES H. SAPPER.

Witnesses:
GEO. L. CHADBORN,
GEO. F. CHADBORN.